(12) United States Patent
Iwatake

(10) Patent No.: US 9,126,337 B2
(45) Date of Patent: Sep. 8, 2015

(54) ROBOT SYSTEM HAVING A ROBOT FOR CONVEYING A WORKPIECE

(71) Applicant: FANUC CORPORATION, Minamitsuru-gun, Yamanashi (JP)

(72) Inventor: Takahiro Iwatake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/255,075

(22) Filed: Apr. 17, 2014

(65) Prior Publication Data

US 2014/0316573 A1   Oct. 23, 2014

(30) Foreign Application Priority Data

Apr. 18, 2013 (JP) ................. 2013-087386

(51) Int. Cl.
*G05B 15/00* (2006.01)
*G05B 19/00* (2006.01)
*B25J 9/16* (2006.01)

(52) U.S. Cl.
CPC .................... *B25J 9/1694* (2013.01)

(58) Field of Classification Search
CPC ..................................... B25J 9/1694
USPC .......................................... 700/258
See application file for complete search history.

(56) References Cited

U.S. PATENT DOCUMENTS

| | | | |
|---|---|---|---|
| 9,002,507 B2* | 4/2015 | Mattern et al. ................ | 700/228 |
| 2009/0076657 A1* | 3/2009 | Tsuboi et al. ................ | 700/275 |
| 2009/0173560 A1* | 7/2009 | Nakamoto et al. ............ | 180/167 |
| 2013/0054025 A1* | 2/2013 | Ito ................................. | 700/246 |
| 2013/0199010 A1* | 8/2013 | Osato et al. .................... | 29/283 |
| 2013/0293701 A1* | 11/2013 | Tani, Kota .................... | 348/135 |
| 2014/0025205 A1* | 1/2014 | Inazumi ........................ | 700/258 |

FOREIGN PATENT DOCUMENTS

| | | |
|---|---|---|
| JP | H02-145277 A | 6/1990 |
| JP | H03-55189 A | 3/1991 |
| JP | H04-257003 A | 9/1992 |
| JP | H04-283085 A | 10/1992 |
| JP | 5-116081 A | 5/1993 |
| JP | 5-241626 A | 9/1993 |
| JP | 7-205075 A | 8/1995 |
| JP | 2000-263481 A | 9/2000 |
| JP | 3300682 B2 | 7/2002 |
| JP | 2004-249391 A | 9/2004 |

(Continued)

*Primary Examiner* — Khoi Tran
*Assistant Examiner* — Harry Oh
(74) *Attorney, Agent, or Firm* — Lowe Hauptman & Ham, LLP

(57) ABSTRACT

A robot system includes a three-dimensional measuring device for obtaining positional information of a workpiece, a robot having a tool capable of holding a workpiece, and a control device for controlling the robot. The control device stores association data which associate the positional information of the workpiece with a center-of-gravity position of the workpiece. A center-of-gravity position of the workpiece to be picked out is estimated, based on the positional information obtained by the three-dimensional measuring device and on to the association data. The control device determines at least one of the holding position of the workpiece, the picking-out direction and the position and posture of the tool, based on the estimated center-of-gravity position.

8 Claims, 8 Drawing Sheets

(56) References Cited

FOREIGN PATENT DOCUMENTS

| JP | 3925020 B2 | 6/2007 |
| JP | 2009-248214 A | 10/2009 |
| JP | 2011-183537 A | 9/2011 |
| JP | 2011-201007 A | 10/2011 |
| JP | 2012-40634 A | 3/2012 |

* cited by examiner

FIG. 7
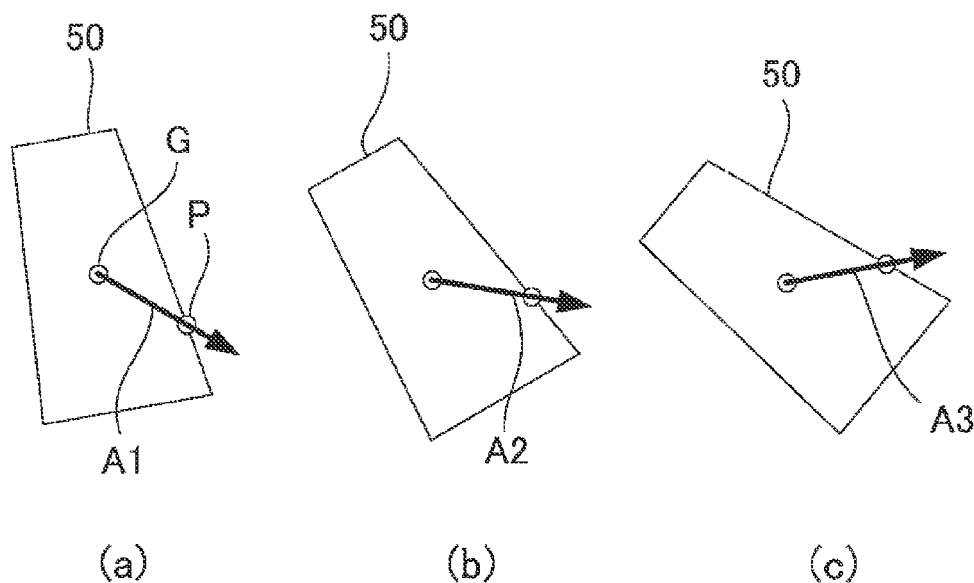
(a) (b) (c)
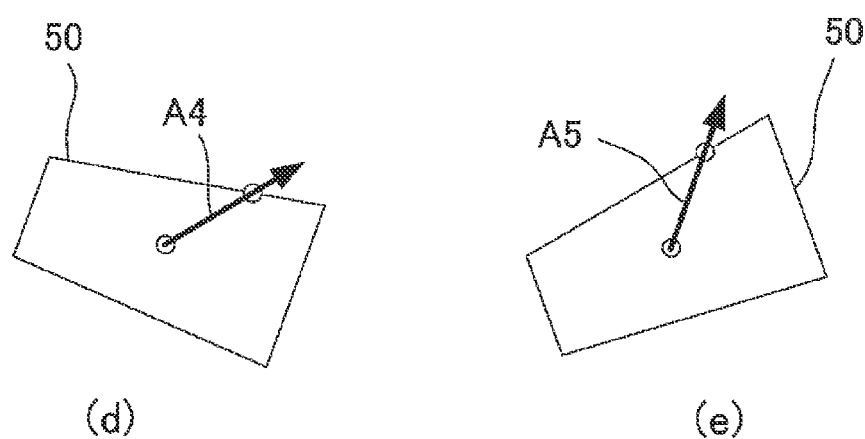
(d) (e)

FIG. 8
(a) 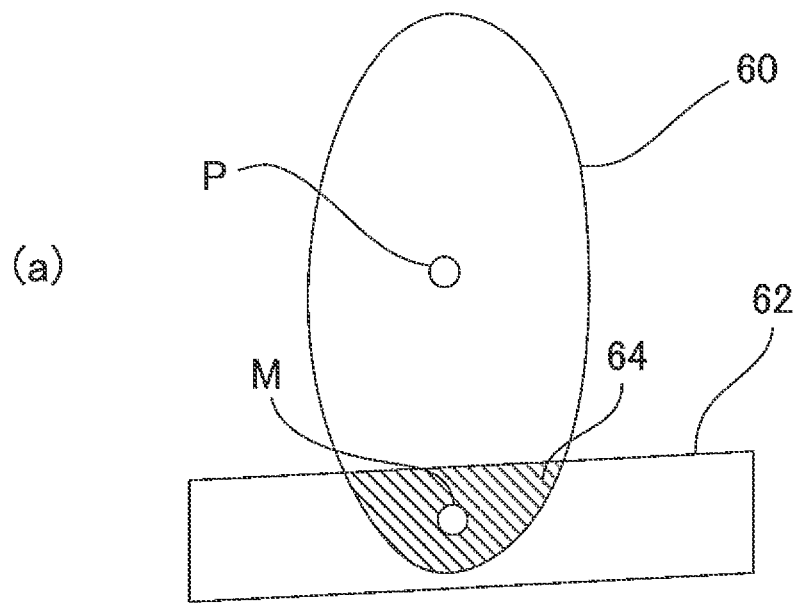
(b) 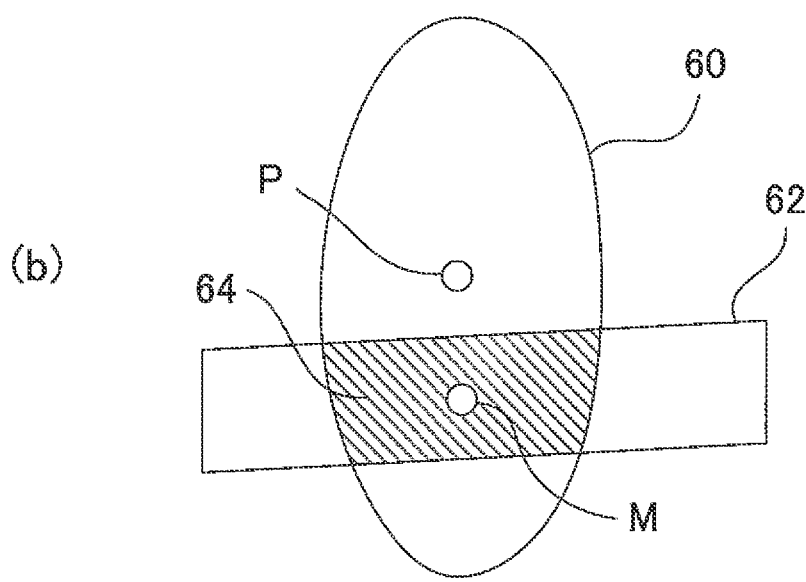

ROBOT SYSTEM HAVING A ROBOT FOR CONVEYING A WORKPIECE

RELATED APPLICATIONS

The present application claims priority to Japanese Application Number 2013-087386, filed Apr. 18, 2013, the disclosure of which is hereby incorporated by reference herein in its entirety.

BACKGROUND OF THE INVENTION

1. Field of the Invention

The present invention relates to a robot system having a robot used for picking out and conveying a workpiece.

2. Description of the Related Art

A known system includes a robot used for picking out workpieces placed at unspecified positions, such as randomly piled workpieces in a container, by using a tool, and conveying the picked workpiece to a predetermined destination. In such a robot system, when the position and posture of the workpiece to be picked out are not accurately recognized, the position and posture of the workpiece is unknown. Therefore, a positional relationship between the workpiece and the tool cannot be specified at the time of holding the workpiece by the tool. More specifically, in the case where the workpiece is held in an unspecified manner, or the randomly-piled workpiece is held on a portion which is easy to hold, a portion of the workpiece which is held by the tool may vary every time. The posture of the workpiece relative to the tool when the workpiece is held by the tool may also vary every time. In these cases, as well as in the case where a position of the center of gravity of the workpiece cannot be determined even when the position and posture of the workpiece is known, it cannot be ensured that a positional relation between the tool and the center-of-gravity position of the workpiece becomes a desired one.

As a result, the workpiece may be held at a position distant from the center of gravity of the workpiece, or in an unstable posture. In this case, since the workpiece is not held stably, the position at which the workpiece is held by the tool may move relative to the tool, resulting in a change in the holding state of the workpiece, or the workpiece may fall during the conveyance, damaging peripheral devices. These may require the system to be temporarily stopped, and even pose a risk to workers in the surrounding area.

JP-A-2011-183537 discloses related art in which a holding state of the workpiece is checked, and if necessary, the workpiece is held again in a different posture. JP-A-5-241626, JP-A-2004-249391 and JP-A-2011-201007 disclose related art in which a posture of the workpiece relative to the tool is corrected by using a visual sensor or the like. JP-B-3300682 discloses related art in which operation of the robot is determined in accordance with a teaching model appropriate for picking out the workpiece by associating the image data of the workpiece obtained from a plurality of directions with the teaching model, and associating information on a direction between the robot and the workpiece relative to each other with the teaching model. JP-B-3925020 discloses related art in which when the robot fails to pick out a workpiece, the robot is operated to move the workpiece closer to the center of the container. JP-A-2000-263481 discloses related art in which when an abnormality is detected during the picking process of the workpiece, the picking process is suspended to retract the robot. JP-A-5-116081, JP-A-2012-40634 and JP-A-7-205075 disclose related art in which the weight and the center-of-gravity position of the workpiece, and the direction of the gravity force are calculated, in order to compensate an influence of the gravity force on a force acting between the tool and the workpiece.

According to the known related art described above, an additional step is required to hold the workpiece again when the holding state of the workpiece is unstable. This results in increased cycle time. Accordingly, there is a need for a robot system which allows the workpiece to be picked out stably, without need to hold the workpiece again once it is picked out.

SUMMARY OF THE INVENTION

According to a first aspect of the present invention, a robot system for picking out and conveying a workpiece placed in a three-dimensional space, the robot system comprising: a three-dimensional measuring device for measuring a surface position on the workpiece to obtain positional information of a plurality of points on a surface of the workpiece in a three-dimensional space; a robot movable in accordance with a specified position and posture; a tool attached to a tip portion of the robot and adapted to hold the workpiece; a force measuring part for measuring a force acting on the tool by the workpiece when the workpiece is held by the tool; and a control device for controlling the robot, the control device comprising: a workpiece identifying part for identifying a workpiece to be picked out and a position and posture of the workpiece, based on the positional information of the plurality of points obtained by the three-dimensional measuring device; a picking position and posture determining part for determining a holding position of the workpiece, a picking-out direction of the workpiece and a position and posture of the tool, so as to pick out the workpiece identified by the workpiece identifying part; a center-of-gravity position calculating part for calculating a center-of-gravity position of the workpiece held by the tool, based on force data measured by the force measuring part with a plurality of postures of the robot holding the workpiece; an associating part for associating the positional information of the workpiece held by the tool, which is obtained by the three-dimensional measuring device with the center-of-gravity position of the workpiece calculated by the center-of-gravity position calculating part; an association storing part for storing a result of the association made by the associating part; and a center-of-gravity position estimating part for estimating a center-of-gravity position of the workpiece identified by the workpiece identifying part, based on the result of the association stored by the association storing part, wherein the picking position and posture determining part is adapted to determine at least one of the holding position of the workpiece identified by the workpiece identifying part at the time of picking out the workpiece, the picking-out direction of the workpiece, the position and posture of the tool, based on the center-of-gravity position of the workpiece estimated by the center-of-gravity position estimating part, is provided.

According to a second aspect of the present invention, the robot system according to the first aspect, wherein the picking position and posture determining part is adapted to determine a holding position of the workpiece, based on the center-of-gravity position of the workpiece estimated by the center-of-gravity position estimating part, and wherein the picking position and posture determining part is adapted to determine an actual holding position of the workpiece at which the workpiece can be held, the actual holding position of the workpiece being a holding position falling within a range defined by a predetermined threshold from the holding position situated at a shortest distance from the center-of-gravity position of the workpiece estimated by the center-of-gravity position estimating part, is provided.

According to a third aspect of the present invention, the robot system according to the first aspect, wherein the picking position and posture determining part is adapted to determine a holding position of the workpiece, based on the center-of-gravity position of the workpiece estimated by the center-of-gravity position estimating part, and wherein the picking position and posture determining part is adapted to determine an actual holding position of the workpiece at which the workpiece can be held, based on the center-of-gravity position of the workpiece and on the picking-out direction of the workpiece or the posture of the tool at the time of picking out the workpiece, is provided.

According to a fourth aspect of the present invention, the robot system according to the first aspect, wherein the picking position and posture determining part is adapted to determine a position and posture of the tool at the time picking out the workpiece so that a moving direction at the time of picking out the workpiece matches a direction oriented from the center-of-gravity position to the holding position or to a position offset from the holding position by a predetermined distance, is provided.

According to a fifth aspect of the present invention, the robot system according to one of the first to fourth aspects, wherein the workpiece identifying part is adapted to identify another workpiece as an alternative, in the case where a distance between the center-of-gravity position and the holding position determined by the picking position and posture determining part or a position offset from the holding position exceeds a predetermined threshold, is provided.

According to a sixth aspect of the present invention, the robot system according to one of the first to fifth aspects, wherein in the case where the workpiece identified by the workpiece identifying part is under another workpiece, and a distance between a position defined in an area where the workpieces are placed on top of another and the holding position of the workpiece determined by the picking position and posture determining part or a position offset from the holding position by a predetermined distance is not greater than a predetermined threshold, the workpiece identifying part is adapted to identify another workpiece as an alternative, is provided.

According to a seventh aspect of the present invention, the robot system according to one of the first to sixth aspects, further comprising: a detecting part for detecting an intensity of a force and vibration generated at the time of picking out the workpiece, based on force data at the time of picking out the workpiece; and a stability determining part for determining stability at the time of picking out the workpiece, based on a result of detection by the detecting part, wherein the workpiece identifying part is adapted to change a priority order at the time of identifying the workpiece, based on a result of determination by the stability determining part, is provided.

According to an eighth aspect of the present invention, the robot system according to one of the first to sixth aspects, further comprising: a detecting part for detecting an intensity of a force and vibration generated at the time of picking out the workpiece, based on force data at the time of picking out the workpiece; and a stability determining part for determining stability at the time of picking out the workpiece, based on a result of detection by the detecting part, wherein the picking position and posture determining part is adapted to change a holding position of the workpiece, a picking-out direction of the workpiece or a posture of the tool at the time of picking out the workpiece, based on a result of determination by the stability determining part, is provided.

These and other objects, features and advantages of the present invention will become more apparent in light of the detailed description of exemplary embodiments thereof as illustrated by the drawings.

BRIEF DESCRIPTION OF THE DRAWINGS

FIG. 7 shows a manner in which the workpiece is picked out according to one embodiment;

FIG. 8 shows exemplary workpieces placed on top of another;

DETAILED DESCRIPTION OF THE INVENTION

Figure 1:
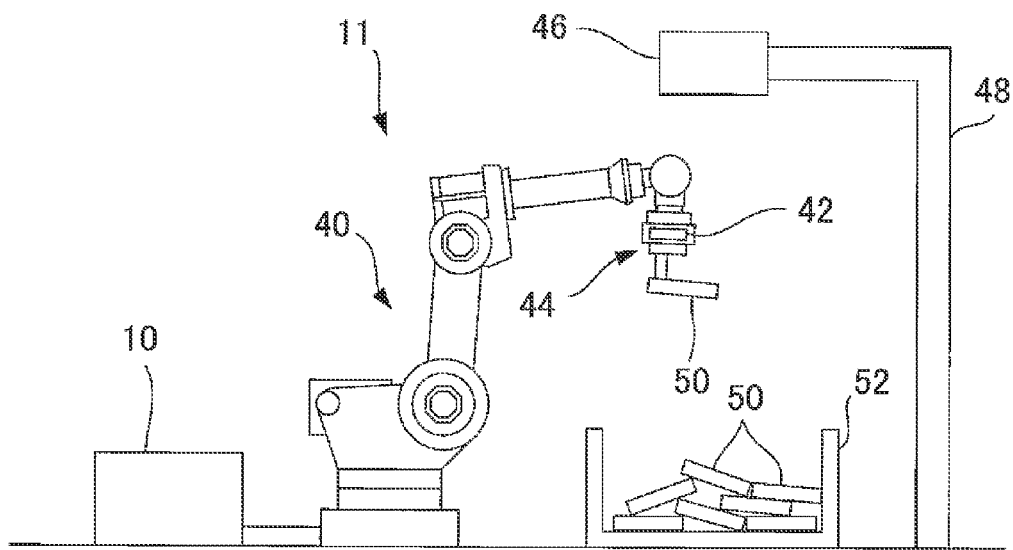
FIG. 1 schematically illustrates an exemplary configuration of a robot system according to one embodiment.

Embodiments of the present invention will be described with reference to the accompanying drawings. In the following explanation, force includes moment of force as well as force itself, unless mentioned otherwise. FIG. 1 schematically shows an exemplary configuration of a robot system 11 according to one embodiment. The robot system 11 includes a robot 40 movable in accordance with a specified position and posture, a control device 10 for controlling the robot 40, and a three-dimensional measuring device 46 for measuring a three-dimensional surface position on a workpiece 50. In the robot system 11, the workpiece 50 is picked out and conveyed by using a tool 44, based on information obtained by measuring three-dimensional points on the workpieces 50 randomly piled in a container 52 with a three-dimensional measuring device 46. Although the illustrated robot 40 is a six-axis robot, the present invention can be applied to any known type of the robot in the same way. Each drive axis of the robot 40 is controlled by the control device 10, so as to position a tip portion of the robot arm at a specified position in a three-dimensional space. The control device 10 has a hardware configuration, including but not limited to, a CPU, a ROM, and a RAM and is designed to perform various functions as described below.

The robot 40 is used to pick out a workpiece 50 from workpieces 50 randomly piled in the container 52 and move it to a predetermined destination, such as a conveyor or a working table (not shown). The robot 40 is provided with a six-axis force sensor 42, which serves as a force measuring part, at a tip portion of the arm. A tool 44 in the form of a pneumatic suction pad is attached to the sensor 42. The tool 44 is designed to hold the workpiece 50 with a suction force by generating negative pressure. The sensor 42 is designed to measure a force acting on the tool 44 when the workpiece 50 is held by the tool 44.

Instead of the force sensor 42, a force acting on the tool 44 may be indirectly obtained by estimating it, based on an electric current value supplied to electric motors for driving each joint of the robot 40. A force sensor may be attached on the tool 44, so as to measure the force acting on the tool 44. Some existing picking systems for randomly piled workpieces are provided with a force measuring part in order to detect collision, contact or excessive load, which may be caused by the tool 44 attached to a tip portion of the robot 40 hitting against or coming in contact with a workpiece 50 or the container 52, or interfering with other workpieces 50 during the picking out process. In the case where the robot 40 includes a force measuring part in order to prevent a collision, detect excessive load, or carry out force monitoring or force control, the force measuring part may be used instead of the force sensor 42.

The tool 44 may have other configuration as long as it can hold the workpiece 50. For example, the tool may be in the form of two claws which open and close to hold the workpiece therebetween, or may include an electromagnet for generating an attractive force on the workpiece 50. A portion of the tool, which comes in contact with the workpiece 50, may have a flexible structure whose shape can flexibly change when it comes in contact with the workpiece 50, so as not to change a positional relationship between the tool and the workpiece when the workpiece 50 is held by the tool. For example, the tool may have a pneumatic suction structure made of a spring or bellows or a flexible material provided with a plurality gaps through which air passes, so as to attract the workpiece by sucking and maintain the holding state.

As shown in FIG. 1, the robot system 11 includes a three-dimensional measuring device 46 for measuring a three-dimensional position of a surface of the workpieces 50 contained in the container 52. The three-dimensional measuring device 46 is mounted on a support stand 48 and provided in position so as to measure the workpieces 50 in the container 52. The three-dimensional measuring device 46 is not limited to any particular type of measuring device, provided that it can measure a position of a surface of the workpiece 50 in the three-dimensional space. For example, the three-dimensional measuring device 46 may be a measuring device designed to obtain three-dimension positional information with laser, or a measuring device designed to obtain three-dimension positional information through image processing of image data. The three-dimensional measuring device 46 is mounted in a non-limiting manner, and, for example, may be fixedly mounted on a surrounding object such as a floor or a wall, or on the robot arm of the robot 40.

The three-dimensional measuring device 46 outputs three-dimension positional information of the workpiece 50 obtained by measuring positions of three-dimensional points on a surface of the workpiece 50 placed in the container 52 to the control device 10 of the robot 40. The three-dimension positional information of the workpiece 50 input to the control device 10 is stored in a storing part 24 of the control device 10, which will be described below. The storing part 24 may be used to store the image data which is obtained by the three-dimensional measuring device 46 and is output to the control device 10 to calculate the positions of the three-dimensional points on the workpiece 50 by the control device 10. Based on the positional information of the three-dimensional points obtained by the three-dimensional measuring device 46, a boundary between workpieces or between a workpiece and other objects are estimated to obtain the positional information of the respective workpieces. In this connection, the boundaries between workpieces and between the workpiece and other objects are estimated based on changes in a surface defined by the three-dimensional points, whether or not surface regions are smoothly connected, a portion where changes in the positions of the three-dimensional points exceed a predetermined threshold or a predetermined three-dimensional shape of the workpiece or the like. As the positional information of the workpiece, the positional information of each workpiece is obtained by this estimation process with the positional information of the three-dimensional points obtained by the three-dimensional measuring device 46. The positional information of the workpiece is positional data, based on which a position of the workpiece or a position where the workpiece can be held can be determined from the positions of the points on the surface of the workpiece to estimate the position and posture of the workpiece.

Figure 2:
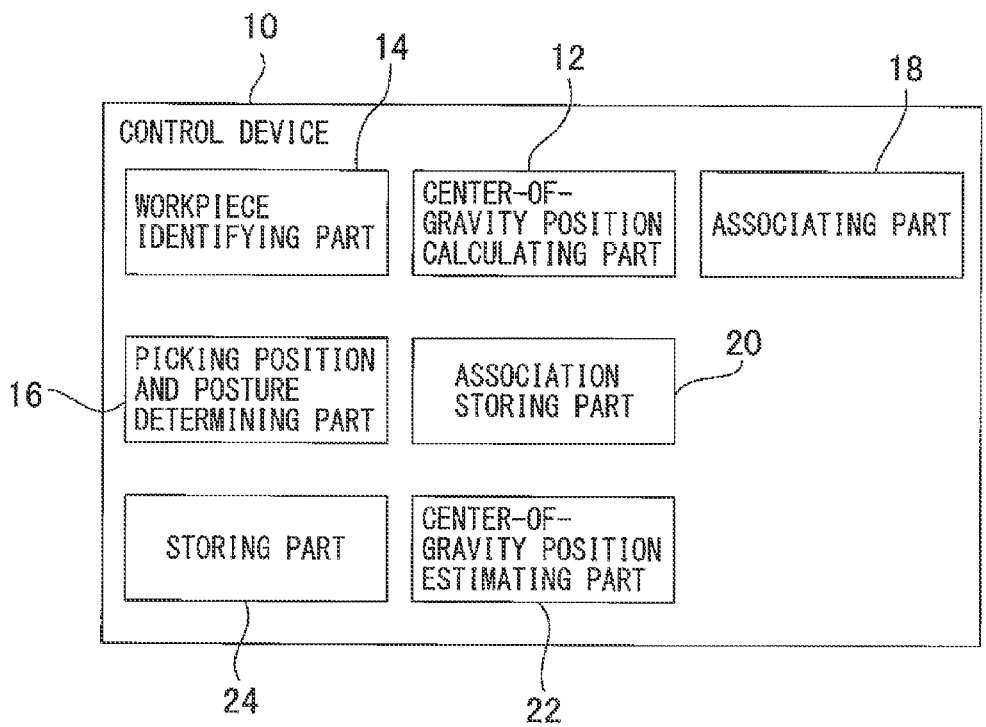
FIG. 2 shows a functional configuration of a control device according to one embodiment.

FIG. 2 shows a functional configuration of the control device 10 according to the embodiment. As illustrated, the control device 10 includes a center-of-gravity position calculating part 12, a workpiece identifying part 14, a picking position and posture determining part 16, an associating part 18, an association storing part 20, a center-of-gravity position estimating part 22, and a storing part 24. The control device 10 may also include a three-dimensional points calculating part for calculating a position of a three-dimensional points on the workpiece 50 based on data such as the images obtained by the three-dimensional measuring device 46.

The center-of-gravity position calculating part 12 calculates a position of the center of gravity of the workpiece 50 held by the tool 44, based on the force data measured by the force sensor 42 with a plurality of postures of the robot 40. The force data include data related to a force and a moment of force. In the present specification, the center-of-gravity position means a position of the center of mass, unless mentioned otherwise.

The associating part 18 associates the positional information of the workpiece 50 with the center-of-gravity position of the workpiece 50 calculated by the center-of-gravity calculating part 12. At this associating process, the positional information of the workpiece 50 is obtained by the three-dimensional measuring device 46 with the workpiece 50 being held by the tool 44, in order to associate it with the center-of-gravity position of the workpiece 50. The associating part 18 obtains a positional relationship between the center-of-gravity position of the workpiece 50 and a distribution of three-dimensional points on a surface of the workpiece 50 in a coordinate system as the positional information of the workpiece 50. When a distribution of three-dimensional points on the workpiece 50 are obtained to some extent, based on the positional information of the workpiece, the center-of-gravity position can be estimated through matching according to a known method such as pattern recognition. Alternatively, the association or estimation may be performed in the way described below. Based on the distribution of the three-dimensional points on the surface of the workpiece 50 and the center-of-gravity position of the workpiece 50, a coordinate system which represents the position and posture of the workpiece 50 and has the origin at the center-of-gravity is specified. And the coordinate system is associated with the distribution of the three-dimensional points on the surface of the workpiece 50. When certain positional information of the workpiece 50 is obtained, the position and posture of the coordinate system is calculated from the distribution of the three-dimensional points, and then the center-of-gravity position or the position and posture of the workpiece are estimated. The process for association by the associating part 18 will be described below. The association storing part 20 stores the result of the association by the associating part 18.

The workpiece identifying part 14 identifies a workpiece to be picked out and the position and posture of the workpiece, based on the three-dimension positional information of a plurality of points on the surface of the workpiece 50, which is obtained by the three-dimensional measuring device 46. The workpiece 50 to be picked out means a workpiece 50 considered to be stably or easily picked out. For example, a workpiece 50 may be recognized as the workpiece 50 to be picked out when it has larger area which can be recognized from above, or it is located at a higher position, or it is placed on another workpiece. The position and posture of the workpiece 50 identified by the workpiece identifying part 14 may be an approximate position and posture of the workpiece, which allow the workpiece 50 to be held, obtained based on the position of the three-dimensional points on the surface of the workpiece. Specifically, an approximate position of the workpiece and/or an approximate position at which the workpiece can be held can be determined from the positions of the points on the surface of the workpiece. Based on such positional information, the position and posture of the workpiece are estimated, allowing the workpiece to be held accordingly. The position and posture of the workpiece may be preferably estimated with more accuracy based on the positions of the points on the surface of the workpiece. The center-of-gravity position estimating part 22 estimates a position of the center of gravity of the workpiece 50 identified by the workpiece identifying part 14. Specifically, the center-of-gravity position of the workpiece 50 can be calculated in accordance with the positional information of the identified workpiece 50 and the association data stored by the association storing part 20, which define a relationship between the positional information of the workpiece 50 and the center-of-gravity position of the workpiece 50.

The picking position and posture determining part 16 determines the holding position of the workpiece, the picking-out direction of the workpiece, and the position and posture of the tool, so as to allow the workpiece 50 identified by the workpiece identifying part 14 to be picked out. Care may be preferably taken, so as to avoid the container 52 and the workpiece 44 from interfering with each other. According to the present embodiment, the picking position and posture determining part 16 determines at least one of the holding position of the workpiece 50, the picking-out direction of the workpiece 50 and the position and posture of the tool 44, based on the center-of-gravity position of the workpiece 50 estimated by the center-of-gravity position estimating part 22.

In the present invention, the holding position of the workpiece 50 relative to the robot 40 represents a position determined in accordance with a predetermined manner with a reference to a control point defined at the robot arm of the robot 40. Accordingly, the holding position of the workpiece may be defined for convenience. For example, the holding position of the workpiece may be (a) a position of TCP (tool center point: a control point defined at the robot arm) or a position offset from the TCP by a predetermined distance in a predetermined direction, or (b) a position at which the tool 44 actually comes in contact with the workpiece 50. In the case of (b), if there are more than one position at which the tool 44 and the workpiece 50 come in contact with each other, the holding position may be a contact position representative of those positions. For example, in the case where the tool 44 is in contact with three different positions on the workpiece 50 when the workpiece 50 is held, the holding position of the workpiece may be defined at a position representative of the three contact positions such as the center of the contact positions (b1). In an alternative case where the tool includes two claws which open and close to hold the workpiece 50, the holding position of the workpiece may be defined at a position in the middle of the claws (b2), a position offset from the middle of the claws by a predetermined distance (b3), or a position of TCP defined at one of the claws.

The storing part 24 stores a teaching program, an operating program, the center-of-gravity position of the workpiece 50 calculated, the weight of the workpiece 50, three-dimension positional information of the workpiece 50 obtained by the three-dimensional measuring device 46, parameters necessary for various calculations, or results of the calculations, and the like.

Figure 3:
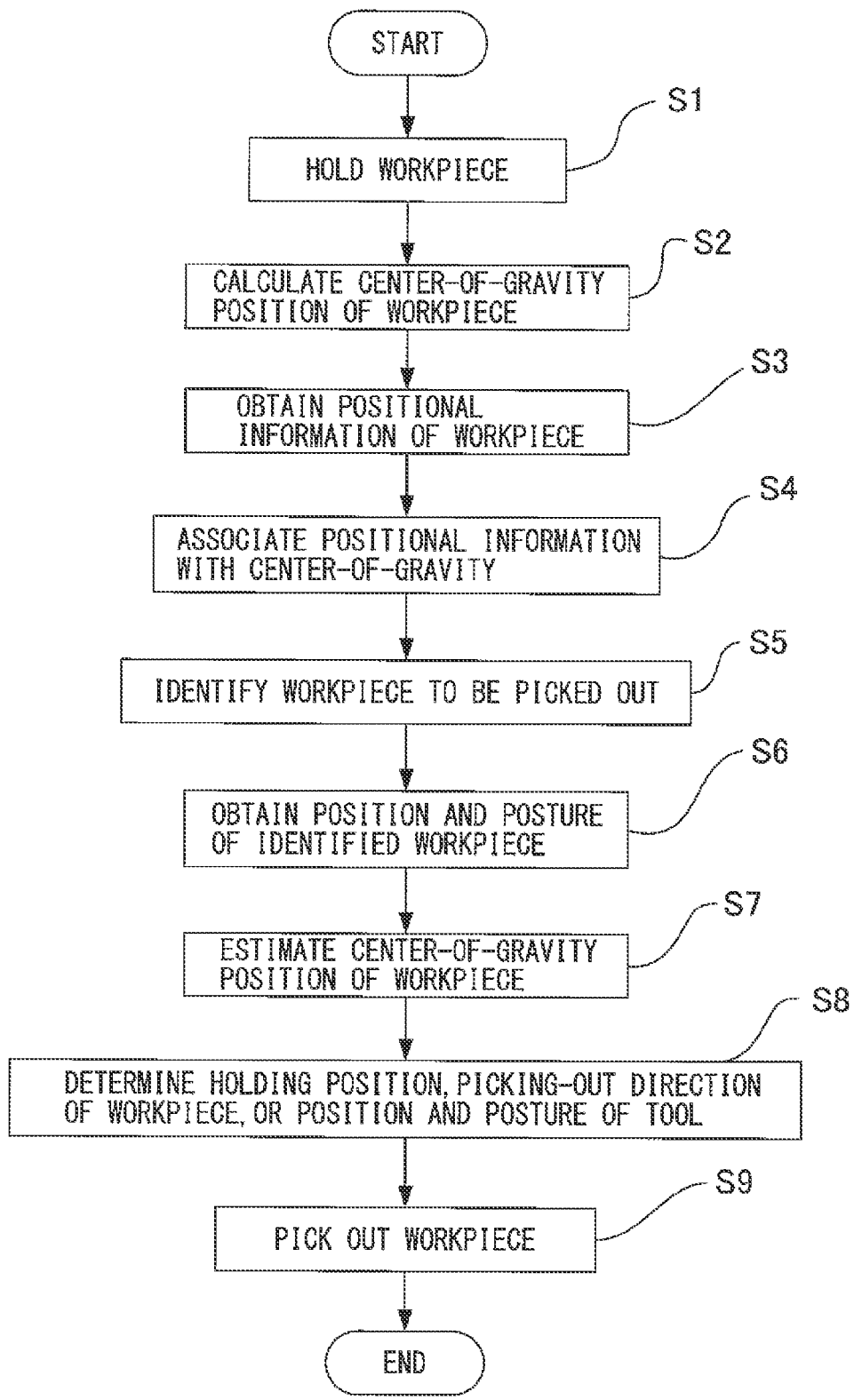
FIG. 3 is a flowchart showing the process carried out by the control device of the robot.

FIG. 3 is a flowchart showing the process carried out by the control device 10 of the robot 40. According to the present embodiment, the association data for associating the positional information of the workpiece 50 and the center-of-gravity position of the workpiece 50 with each other are obtained, as a preparation process (steps S1 to S4) prior to the picking out process of the workpiece 50.

First, the robot 40 is operated according to a predetermined teaching program, to hold the workpiece 50 by the tool 44 (step S1). The center-of-gravity calculating part 12 is then activated to calculate the center-of-gravity position of the workpiece 50 (step S2). The center-of-gravity position of the workpiece 50 held by the tool 44 is obtained at step S2, and therefore the center-of-gravity position of the workpiece 50 is obtained in a coordinate system defined at the force sensor 42 or at a tip portion of the robot 40. The center-of-gravity position of the workpiece 50 is calculated by the center-of-gravity position calculating part 12, based on the force data detected by the force sensor 42 as the posture of the workpiece is changed by operating the robot 40 after holding the workpiece 50 at step S1.

The center-of-gravity position calculating part 12 calculates the center-of-gravity position and the weight of the workpiece 50, based on a force influenced by the gravity force, which can be obtained from the force data when the robot 40 is stopped, as described in JP-A-5-116081, JP-A-2012-40634 and JP-A-7-205075. Alternatively, the center-of-gravity and the weight of the workpiece 50 may be calculated based on a force influenced by the gravity force and inertia force, which can be obtained from the force data when the robot 40 is in operation. In either case, the center-of-gravity position and the weight of the tool 44 are obtained beforehand. The center-of-gravity position and the weight of the tool 44 are calculated by the center-of-gravity position calculating part 12 in relation to the tool in the state of not holding the workpiece. The center-of-gravity position and the weight of the workpiece 50 are then calculated based on the center-of-gravity position and the weight of the tool 44 and the workpiece 50 combined together, and the center-of-gravity position and the weight of the tool 44 which were obtained beforehand. In this process, if the center-of-gravity position of the tool 44 and the workpiece 50 combined together can be considered to be as effective as the center-of-gravity position of the workpiece 50 in relation to the present invention, the former center-of-gravity can be used as well for simplicity. Instead of calculating the weight of the workpiece 50, a weight value measured or calculated beforehand may also be used. If the individual workpieces 50 have little weight difference from one another, and the known value can be used, the process for calculating the weight of the workpiece 50 may be omitted. In this case, an error in calculating the center-of-gravity position may be reduced.

A known method for identifying inertia parameters of a link (mass, the center-of-gravity position and inertia tensor) is used to apply the force data of the robot 40 in operation. For example, Newton-Euler equation with respect to an object attached to the force sensor 42 is established to calculate the weight and the center-of-gravity position of the object attached to the force sensor 42 (the tool 44 and the workpiece 50 held by the tool 44) by least square estimation with the relational expression with respect to a plurality of postures. Further, based on the calculation result and on the center-of-gravity position and the weight of the tool 44, which were obtained beforehand, the center-of-gravity position and the weight of the workpiece 50 held by the tool 44 are calculated.

In the case where the center-of-gravity position of the tool changes during operation, such as in the case where the tool consists of two claws which open and close, the center-of-gravity position and the weight of the constituent elements of the tool are obtained beforehand. A measuring device is used to measure a stroke length of the movable portion of the tool, such as claws. Based on the stroke length and the weight of the movable portion, the center-of-gravity position of the tool is corrected. This allows the center-of-gravity position of the tool and therefore the center-of-gravity of the workpiece 50 to be accurately calculated.

A moving position and moving path of the workpiece 50 for calculating the center-of-gravity position of the workpiece 50 may be preferably predetermined. For example, a moving position and moving path are used, when it is determined that they actually allow the center-of-gravity position and the weight of the workpiece to be calculated with the workpiece whose center-of-gravity position and weight are known. The determination process as to whether or not the center-of-gravity position and the weight of the workpiece can be calculated can be carried out, for example, based on whether or not the center-of-gravity position and the weight calculated exceed a predetermined threshold, or whether or not a matrix of the equation used for the calculation is degenerated, or whether or not a condition number of the matrix in the equation is smaller than a predetermined threshold, or the like. The result of the determination process as to whether or not the center-of-gravity position and the weight can be calculated may be indicated on a display of the teaching device or with sound or vibration from the teaching device or with an indication lamp, depending on the result.

Subsequently, positions of a plurality of three-dimensional points on a surface of the workpiece 50 held by the tool 44 are measured by the three-dimensional measuring device 46, to obtain the positional information of the workpiece 50 (step S3). At step S3, the positional information of the workpiece 50 held by the tool 44 is obtained in a coordinate system defined at the force sensor 42 or a coordinate system defined at a tip portion of the robot 40. The workpiece 50 may take any posture, and the positional information of the workpiece 50 can be obtained based on the positions of a plurality of three-dimensional points on a surface of the workpiece 50 obtained with the posture of the workpiece 50 being changed in the process. The calculation of the center-of-gravity position of the workpiece 50 at step S2 can be simultaneously carried out with step S3. In other words, in order to obtain the positional information of the workpiece 50, the center-of-gravity position of the workpiece 50 may be calculated based on the force data obtained by the force sensor 42 when the position and posture of the workpiece 50 held by the robot 40 are changed relative to the three-dimensional measuring device 46. Based on the weight of the workpiece 50 calculated in this process, it may be determined that the present invention can be applied only when the weight of the workpiece 50 exceeds a predetermined threshold.

The association data are obtained by the associating part 18 (step S4), based on the positional information of the workpiece 50 obtained at step S3 and the center-of-gravity position of the workpiece 50 obtained at step S2. The association data may define a correspondence between the positional information of the workpiece 50 and the center-of-gravity position of the workpiece, so as to allow the center-of-gravity position to be estimated. In the case where a position of a portion of the workpiece 50 cannot be measured, due to the portion of the workpiece 50 being held by the tool or the portion of the workpiece 50 interfering with the robot 40 or the tool 44, the positional information of the portion of the workpiece 50 cannot be obtained by the three-dimensional measuring device 46.

In order to increase the accuracy of association between the positional information of the workpiece and the center-of-gravity position of the workpiece, the several data may be obtained by carrying out the processes at steps S2 and S3 several times with different holding position. If there are different types of the workpieces 50 in the container 52, the associating part 18 may preferably associate the positional information of the workpiece and the center-of-gravity position of the workpiece with each other in relation to the respective types of the workpieces beforehand, by carrying out the processes at steps S1 to S4 for the respective types of the workpieces.

The tool used to hold the workpiece 50 in the preparation process at steps S1 to S4 may have a configuration different from that of the tool 44 which is actually used to pick out and convey the workpiece 50. For example, the actual tool used in the picking out may be sometimes a tool whose suction force or holding force is weak so as not to damage the workpiece 50, or a tool with a spring structure or bellows structure so as to absorb a positional shift or shock at the time of holding the workpiece. However, during the preparation process it is necessary merely to hold the workpiece, and therefore, the type of the workpiece may also be changed as necessary. In order to increase accuracy in measuring the center-of-gravity position, the workpiece may be held at a position as far from the center-of-gravity of the workpiece as possible. In order to increase the accuracy of association, the processes at steps S2 and S3 may be carried out several times, with different holding position so as to change the position and the center-of-gravity position of the workpiece 50 relative to the tool.

Subsequently, the picking out process of the workpiece 50 is carried out (steps S5 to S9). In the picking out process of the workpiece 50, a workpiece 50 which is considered to be stably or easily picked out is identified by the workpiece identifying part 14 (step S5). Based on the three-dimension positional information of a plurality of points on a surface of the workpiece 50 obtained by the three-dimensional measuring device 46, a boundary between workpieces 50 or a boundary between a workpiece 50 and other objects are specified and the positional information of the respective workpieces are obtained. In accordance therewith, the arrangement of a plurality of workpieces 50 in the container 52 is estimated, and then the workpiece 50 to be picked out is identified. For example, a workpiece having larger surface area which can be recognized, or a workpiece situated at a higher position, or a workpiece placed on another workpiece are identified at step S5.

The position and posture of the workpiece 50 identified by the workpiece identifying part 14 are obtained (step S6). The position and posture of the workpiece 50 may be an approximate position and posture of the workpiece 50 in which the workpiece 50 can be held, and the approximate position and posture of the workpiece 50 are obtained based on the positions of the three-dimensional points on the surface of the workpiece. Specifically, based on the positions of the three-dimensional points on the surface of the workpiece, an approximate position or approximate holding position at which the workpiece can be held are obtained. Further, based on the positional information, the position and posture of the workpiece are estimated to hold the workpiece. The position and posture of the workpiece are preferably estimated as accurately as possible, based on the positions of the three-dimensional points on the surface of the workpiece.

The center-of-gravity position estimating part 22 is then activated to estimate the center-of-gravity position of the workpiece 50 identified by the workpiece identifying part 14 at step S6 (step S7). The estimation is carried out based on the positional information of the workpiece 50 obtained based on the three-dimensional position information of the points on the surface of the workpiece 50 obtained by the three-dimensional measuring device 46, and the association data, which were previously obtained at step S4, for associating the positional information of the workpiece with the center-of-gravity position of the workpiece. The estimation of the center-of-gravity position of the workpiece 50 on the reference coordinate system of the robot 40 is carried out by comparing the positional information of the workpiece 50 identified by the workpiece identifying part 14 with the positional information of the workpiece in the association data between the positional information and the center-of-gravity of the workpiece in accordance with a known matching method, such as pattern recognition.

The picking position and posture determining part 16 determines a manner in which the workpiece 50 can be stably and easily picked out, based on the position and posture of the workpiece 50 obtained at step S6, and on the center-of-gravity position of the workpiece 50 obtained at step S7. For example, at least one of the holding position of the workpiece 50, the picking-out direction of the workpiece 50 and the position and posture of the tool 44 are determined (step S8). In accordance with the manner determined at step S8, the workpiece 50 is picked out (step S9).

The function of the picking position and posture determining part 16 will be further described below. When the workpiece 50 is picked out and moved, the gravity force and inertia force act on the workpiece 50 at its center-of-gravity position. The moment of force around the holding position changes, depending on the positional relationship between the holding position and the center-of-gravity position of the workpiece 50, in particular, such as a distance therebetween, the direction of the gravity force and the moving direction. When the robot 40 conveys the workpiece 50 held by the tool 44, as a force or a moment of force acting at the holding position of the workpiece 50 increases, the holding state of the workpiece may be unstable. Therefore, the positional relationship between the holding position and the center-of-gravity position of the workpiece 50 or the direction in which the workpiece 50 is picked out and conveyed may be changed accordingly, so as to make the moment of force around the holding position smaller, allowing the workpiece to be conveyed more stably. When holding the workpiece 50, the robot 40 is operated to change the position and posture of the tool 44, so that the position of the tool 44 relative to the robot 40 defined in a predetermined manner corresponds to the holding position of the workpiece 50. First, the case where the picking position and posture determining part 16 determines the holding position of the workpiece 50 will be described.

Figure 4:
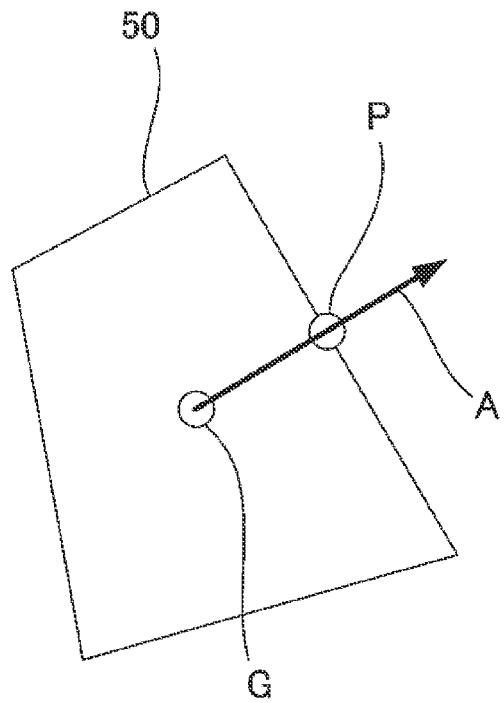
FIG. 4 shows an exemplary holding position of the workpiece determined according to one embodiment.

FIG. 4 shows an exemplary holding position of the workpiece 50 determined according to one embodiment. In the example of FIG. 4, the picking position and posture determining part 16 determines the holding position at a point P situated at the shortest distance from the center-of-gravity position G to a position on the surface of the workpiece 50 at which the workpiece 50 can be held. In this connection, the position on the surface of the workpiece 50 at which the workpiece 50 can be held is a position on the surface of the workpiece 50 which can be held by the tool 44 and the robot 40 is able to reach. The illustrated arrow A shows a picking-out direction of the workpiece 50. The holding position may not necessarily be the position P at the shortest distance from the center-of-gravity position G, and instead selected from positions within a range of predetermined threshold from the position P at the shortest distance.

Figure 5:
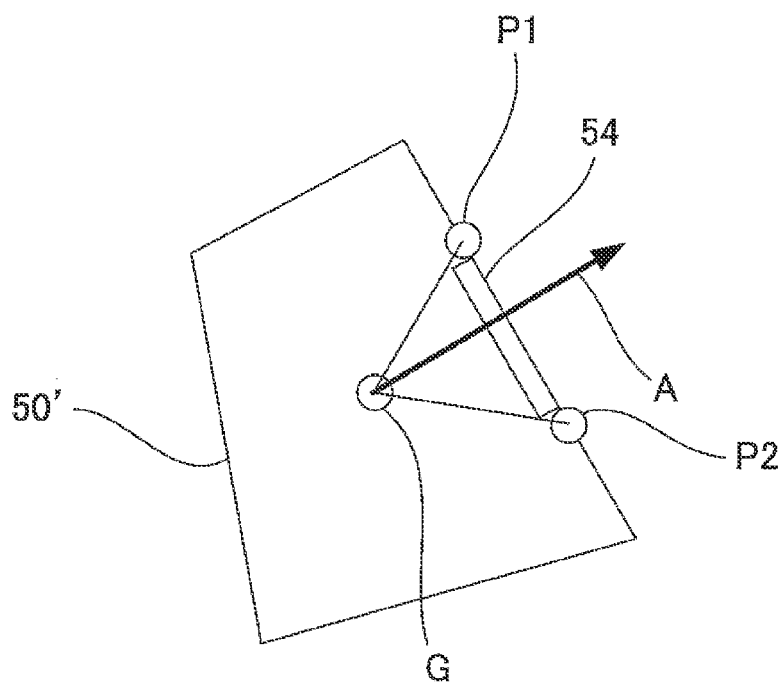
FIG. 5 shows another exemplary holding position of the workpiece determined according to one embodiment.

FIG. 5 shows another exemplary holding position of the workpiece 50' determined according to one embodiment. The workpiece 50' in this example is provided on the surface with a non-holdable area 54, which cannot be held by the tool 44. As illustrated, the holding position in this case is defined at a point distant from the non-holdable area 54 by a predetermined distance and as close to the center-of-gravity position G as possible. In the illustrated example, points P1 and P2 are depicted at the opposite edges of the non-holdable area 54, and point P1 situated closer to the center-of-gravity position G is defined as the holding position. As described above with reference to FIGS. 4 and 5, the picking position and posture determining part 16 determines the holding position at which the workpiece 50 identified by the workpiece identifying part 14 can be stably picked out and conveyed, based on the center-of-gravity position G of the workpiece 50. The picking position and posture determining part 16 restricts the picking-out direction of the workpiece 50 or the position and posture of the tool 44, based on the position of the workpiece 50, the position of the wall of the container 52, the size or shape of the tool 44 or the like, so as to avoid the tool 44 from interfering with the surrounding. Within the restricted range, the picking-out direction of the workpiece 50 or the posture of the tool 44 may be changed. For example, the picking-out direction of the workpiece 50 or the posture of the tool 44 may be oriented to a direction perpendicular to the surface of the workpiece 50, or a direction opposite of the direction of the gravity force, or a direction determined, depending on the posture of the workpiece 50, or a direction parallel to the longitudinal direction of the workpiece 50 or the like, in order to pick out the workpiece 50. If the holding position is defined near the center-of-gravity position of the workpiece 50 in accordance with the examples in FIGS. 4 and 5, the holding state of the workpiece 50 can be stabilized at the time of picking out and conveying the workpiece 50, even when the moving direction or the posture of the workpiece 50 are changed as necessary. Therefore, an unexpected accident or shutdown of the system due to falling of the workpiece 50 or shift of the holding position can be prevented. In the case where the tool consists of two claws which open and close to hold the workpiece, the workpiece may be held such that the respective claws come in contact with the workpiece near positions within a range defined by a predetermined threshold from the position at a shortest distance from the center-of-gravity position of the workpiece.

Figure 6:
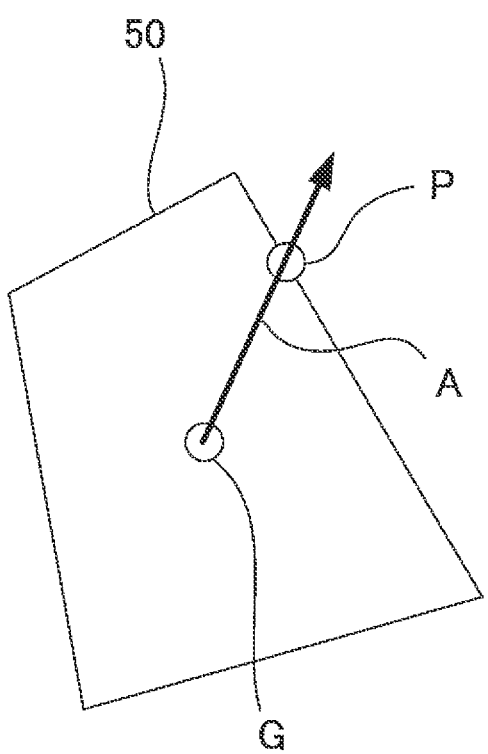
FIG. 6 shows another exemplary holding position of the workpiece determined according to one embodiment.

FIG. 6 shows another exemplary holding position of the workpiece 50 determined according to one embodiment. In the example of FIG. 6, the holding position is defined as point P on a surface of the workpiece 50, at which the workpiece 50 can be held, and which is on the arrow A extending in the picking-out direction of the workpiece 50 through the center-of-gravity position G of the workpiece 50. In the case where the position on a surface of the workpiece 50 distant from the center-of-gravity position G of the workpiece 50 in the picking-out direction is a position at which the workpiece 50 cannot be held or the tool 44 cannot reach, the holding position is defined at a position at the shortest distance from the above-described position or within a predetermined threshold therefrom, at which the workpiece 50 can be held. In this case, the picking-out direction may be any direction. However, it may be determined as follows. If the tool 44 has a suction pad attached to the tip portion of the tool 44, the picking out process may be stably carried out by picking out the workpiece 50 in a direction perpendicular to the surface of the workpiece 50 with which the tip portion of the tool 44 is contact a right angle. In this case, the direction perpendicular to the surface of the workpiece 50 is defined as the picking-out direction. The picking-out direction may be defined as a direction in which the workpiece 50 is picked out and conveyed after the workpiece 50 is held and moved slightly away from the original position in an appropriate direction. The picking-out direction may also be defined as a direction in which the shortest distance from other workpieces is as great as possible, so as to prevent the workpiece 50 from interfering with other workpieces when the tool 44 moves closer relative to the workpiece 50 or when the workpiece 50 is thereafter picked out after being held, based on the positional information of a plurality of workpieces situated near the workpiece 50 identified. Accordingly, if the picking-out direction of the workpiece 50 is determined, an appropriate holding position can be determined based on the picking-out direction of the workpiece 50. Alternatively, arrow A may be oriented in a direction based on the posture of the tool. The holding position may be determined among positions on the surface of the workpiece 50 at which the workpiece 50 can be held, based on the center-of-gravity position of the workpiece 50 and the posture of the tool 44. If the picking-out direction of the workpiece 50 can be determined from the posture of the tool 44, the posture of the tool 44 may be used instead of the picking-out direction of the workpiece 50. In the case where a desired picking-out direction is predetermined, but the tool 44 cannot be moved to a target position on the surface of the workpiece 50 situated away from the center-of-gravity position in the desired picking-out direction due to interference between the tool 44 and the surrounding or the like, a position, at which the tool 44 can be moved, within a predetermined threshold from the target position on the surface of the workpiece 50 is defined as an alternative target holding position. The holding position may be determined among positions on the surface of the workpiece 50 at which the workpiece 50 can be held, and which is on the vector extending in the picking-out direction based on the posture of the tool 44 through the center-of-gravity position G of the workpiece 50. This may be applied when the picking-out direction and the posture of the tool 44 is not the same direction, for example, when the picking-out direction is not changed but the posture of the tool 44 is changed, to be perpendicular to the surface of the workpiece 50 to hold the surface of the workpiece 50 stably and strongly, or to avoid the interfering with the surrounding.

As described above with reference to FIG. 6, the picking position and posture determining unit 16 determines a holding position at which the workpiece 50 identified can be stably picked out and conveyed, based on the center-of-gravity position of the workpiece 50 and the picking-out direction of the workpiece 50 or the posture of the tool 44. The picking position and posture determining part 16 obtains the picking-out direction of the workpiece 50 or the posture of the tool 44 used in the above process beforehand. The picking position and posture determining part 16 restricts the picking-out direction of the workpiece 50 or the position and posture of the tool 44, based on the position of the workpiece 50, the position of the wall of the container 52, the size or shape of the tool 44 or the like, so as to prevent the tool 44 from interfering with the surrounding. Within the restricted range, the picking-out direction and the posture of the tool 44 may be changed. For example, when picking out the workpiece 50, the picking-out direction of the workpiece 50 or the posture of the tool 44 may be oriented to a direction perpendicular to the surface of the workpiece 50, a direction opposite to the direction of the gravity force, or a direction determined, depending on the posture of the workpiece 50, or a direction parallel to the longitudinal direction of the workpiece 50 or the like. In this way, the holding position is determined based on the center-of-gravity position of the workpiece 50 and the picking-out direction of the workpiece 50. Therefore, a force or a moment of force acting at the holding position can be reduced at the time of picking out and conveying the workpiece 50, and the workpiece 50 can be held and conveyed with the stable holding state.

The picking position and posture determining part 16 may also determine the picking-out direction of the workpiece 50, based on the center-of-gravity position of the workpiece 50 and an any holding position. The holding position determined on the surface of the workpiece 50 may be any position in the following example. For example, the holding position may be determined among positions on the surface of the workpiece 50 at which the workpiece 50 can be held, based on the three-dimensional points on the surface of the workpiece 50 which can be recognized by the three-dimensional measuring device 46, as a position in the center of the three-dimensional points recognized, or a position in the center of the face of the workpiece 50 whose surface is large, or a position which is considered to be easy to hold based on the positional information due to relatively smooth surface, or a predetermined position defined relative to the workpiece 50, which can be considered to be easy to hold by taking account of the shape or material, or which is suited to a subsequent process after the conveyance.

The picking position and posture determining part 16 determines the picking-out direction and the moving direction at the time of conveyance of the workpiece, so that a vector from the center-of-gravity position to the holding position is parallel to a vector in the moving direction of the workpiece, based on a positional relationship between the center-of-gravity position of the workpiece 50 and the holding position of the workpiece 50. In this case, similarly to the case described in relation to FIG. 6, the holding position and the center-of-gravity position are aligned on the same line extending in the picking-out direction, and therefore, the workpiece 50 can be stably picked out from the container 52. The picking position and posture determining part 16 may determine the posture of the tool 44 based on the holding position of the workpiece 50 and the center-of-gravity position of the workpiece 50. In the case where the picking-out direction of the workpiece 50 is determined from the posture of the tool 44, the posture of the tool 44 may be determined in this manner. The picking position and posture determining part 16 may preferably restrict the moving direction of the workpiece 50 at the time of the picking out and conveyance, or the position and posture of the tool 44, based on the position of the workpiece 50, the position of the wall of the container 52, or the size or shape of the tool 44 or the like, so as to prevent interference between the tool 44 and the surrounding. Within the restricted range, the moving direction of the workpiece 50 at the time of the picking and conveyance or the posture of the tool 44 may be determined.

According to the above embodiment, the picking position and posture determining part 16 determines the moving direction of the workpiece 50 at the time of the picking out, based on the center-of-gravity position and the holding position.

Among the moving directions determined in this way, there may be the case where the workpiece 50 hits the surrounding workpieces or the container 52, or the moving direction is inappropriate, depending on its position relative to the container 52 or to other workpieces 50, the posture of the robot 40 or structural limitation of the tool 44. As a result, the workpiece 50 may not be properly picked out from the container 52 and therefore it may be necessary to change the moving direction at the time of the picking out and conveyance. In such a case, the workpiece held by the tool 44 is moved after or as its posture is changed, so that the moving direction determined by the center-of-gravity position and the holding position is a desirable direction. For example, referring to FIG. 7 showing the manner in which the workpiece 50 is picked out, in the case where a vector oriented from the center-of-gravity position G to the holding position P of the workpiece 50 includes a downward component as shown in part (a) of FIG. 7, and the workpiece 50 is moved in the direction, it will hit other workpieces or the container 52. Therefore, the workpiece 50 is picked out and conveyed after or as the posture of the workpiece 50 is changed maintaining the holding position P as shown in parts (a) to (e) of FIG. 7, such that the vector from the center-of-gravity position G to the holding position P is oriented upward and in a direction away from the container 52. By changing the posture of the workpiece 50 in this manner, the vector from the center-of-gravity position G to the holding position P of the workpiece 50 becomes a desirable moving direction (as shown by arrows A1 to A5) at the time of the picking out and the conveyance. In accordance therewith, the workpiece 50 is moved by the robot 40, while maintaining the stable holding state of the workpiece 50. Accordingly, the picking out and conveyance process can be properly carried out.

Although the function of the picking position and posture determining part 16 in order to stably pick out the workpiece 50 identified by the workpiece identifying part 14 has been described, there may be the case where it is difficult to pick out and convey the workpiece 50 identified in a stable manner, and therefore it may be preferable to pick out another workpiece 50, instead of the workpiece 50 identified. For example, if the distance between the center-of-gravity position and the holding position exceeds a predetermined threshold, the control device 10 may carry out the identification process by the workpiece identifying part 14 once again.

The case where it is necessary to carry out the identification process of the workpiece 50 once again, in order to identify another workpiece 50 to be picked out, will be described below. For example, if the workpiece 50 identified by the workpiece identifying part 14 is placed under other workpieces, the picking out process may not be carried out smoothly.

FIG. 8 shows a first workpiece 60 and a second workpiece 62 are placed one on top of the other by way of example. Assuming that the workpiece identifying part 14 identifies the workpiece 60 to be picked out, the holding position P and the picking-out direction of the workpiece 60 are determined by the picking position and posture determining part 16 as described above. FIG. 8 shows the workpieces 60 and 62 in such a way that the picking-out direction of the workpiece 60 is oriented upward from the drawing paper. When the holding position and a portion of the workpiece on which another workpiece is placed are close to each other in a view from the picking-out direction of the workpiece, load acting on the holding position P of the workpiece 60 at the time of the picking out is large, even if the portion of the workpiece on which another workpiece is placed is small. Therefore, it is more likely that the picking out the workpiece is unstable. For example, the holding state may be changed or the workpiece may fall during the picking out. In contrast, even when another workpiece is placed on a portion of the workpiece to be picked out, if the holding position and the portion of the workpiece are sufficiently distant from each other, the above-described problem may not be of concern. Part (a) of FIG. 8 shows the arrangement in which a distance between the holding position P and a central position M of an area 64 in which the first workpiece 60 is under the second workpiece 62 is relatively great. On the other hand, part (b) of FIG. 8 shows the case where the distance between the holding position P and the central position M of the area 64 is relatively short. As shown in part (a) of FIG. 8, when the holding position P is sufficiently distant from the central position M of the overlapping area 64, the picking out of the first workpiece 60 can be carried out relatively smoothly. In this case, there is no need to identify another workpiece.

On the other hand, as shown in part (b) of FIG. 8, when the holding position P is close to the overlapping area 64, greater holding force is required in order to stably pick out the first workpiece 60. As a result, the workpiece may not be stably picked out. For example, the holding position P may shift during the picking out, changing the holding state, or the workpiece may fall. Therefore, the control device 10 may be preferably configured such that the workpiece identifying part 14 carries out the identification process once again when the distance between the holding position P and the overlapping area 64 is equal to or smaller than a predetermined threshold.

As briefly explained with reference to FIG. 8, if the holding position and the area in which the workpieces overlap are close to each other, the workpiece identifying part 14 carries out the identification process again. In this case, the workpiece which is determined not to be picked out at that time may be excluded by the workpiece identifying part from candidate workpieces subject to the identification in the next process or one or more processes thereafter, or it may be determined that another workpiece 62 is the next candidate subject to the identification. For example, the determination as to whether or not the holding position and the overlapping area of the workpieces are close to each other can be carried out as follows. It is assumed that workpiece 60 is identified to be picked out. The three dimensional points on the workpiece 60 and workpiece 62 obtained by the three-dimensional measuring device 46 are projected onto a plane extending perpendicular to the vector of the picking-out direction of the workpiece 60. The area 64 in which the workpieces 60 and 62 overlap is estimated on the plane, based on the positional information of the three-dimensional points on the surfaces of the workpieces 60 and 62 obtained by the three-dimensional measuring device 46. A positional center-of-gravity of the overlapping area 64 on the plane is calculated, and the calculated position is set as the central position M. A distance on the plane between the central position M and the holding position, where the holding position P is projected onto the plane, is calculated. If the distance on the plane between the central position M of the area 64 in which the workpieces 60 and 62 overlap and the holding position is equal to or smaller than a predetermined threshold, it is determined that they are close to each other. If the distance on the plane between the central position M and the holding position is greater than a predetermined threshold, it is determined that they are not close to each other. The determination as to whether or not the holding position and the overlapping area of the workpieces are close to each other can be carried out in the following manner. As described above, the holding position on the plane, where the holding position P is projected onto the plane, and the position of the overlapping area 64 on the plane are calculated. The shortest distance on the plane between the holding position and the overlapping area 64 is then calculated. If the shortest distance is equal to or smaller than a predetermined threshold, it is determined that they are close to each other. On the other hand, if the shortest distance is greater than the threshold, it is determined that they are not close to each other.

As described above, the workpiece identifying part 14 identifies a workpiece 50 which is estimated to be stably and/or easily picked out, based on the positional information of the workpieces 50 obtained by the three-dimensional measuring device 46. However, in the process of actually picking out the workpiece 50 identified, it may turn out that it is difficult to carry out the picking out process. This may be due to the lack of information on the workpiece 50 and incomplete recognition of the state of the workpiece 50. For example, there may be false detection or errors in the positional information based on the three-dimensional points on the surface of the workpiece 50 obtained by the three-dimensional measuring device 46. In addition, there may be the lack of information on the workpiece 50 due to an unknown arranging condition of the workpiece 50, for example, there is an undetected portion on the back side of the workpiece 50 or the overlapping area of the workpieces 50. Further, it may be difficult to pick out the workpiece 50 due to its material or surface shape.

Therefore, information regarding easiness to pick out the workpiece 50 is collected, based on the force data of the force or the moment of force measured by the force sensor 42 during the picking out process, and the collected information are associated with the positional information of the workpiece 50 obtained by the three-dimensional measuring device 46. The association data may also be used by the workpiece identifying part 14 to identify the workpiece. As the information regarding easiness of picking out the workpiece 50, the maximum value or the average value of the force, or the maximum or the average of the differential value of the force are collected during the picking out process. If the average value or the maximum value of the force, the moment of force or the differential value thereof are greater than a predetermined threshold when the workpiece 50 is picked out, it can be estimated that it is difficult to pick out the workpiece 50. In such a case, the surrounding workpieces may be pushed away with excessive force, possibly resulting in damaged workpieces, or the workpiece 50 may be held at a distance from the center-of-gravity in an unstable manner. On the other hand, if the above values are smaller than the threshold, it can be estimated that the workpiece 50 was in the state where it is easy to pick out, and that the workpiece 50 was successfully picked out. In this way, the easiness of picking out the workpiece 50 is associated with the positional information of the three-dimensional points on the surface of the workpiece 50 obtained at the time of picking out the workpiece 50, and the association data are stored in the storing part 24. Based on the association data and the positional data of the workpiece obtained by the three-dimensional measuring device 46, the workpiece identifying part 14 can identify the workpiece which can be stably picked out.

Figure 9:
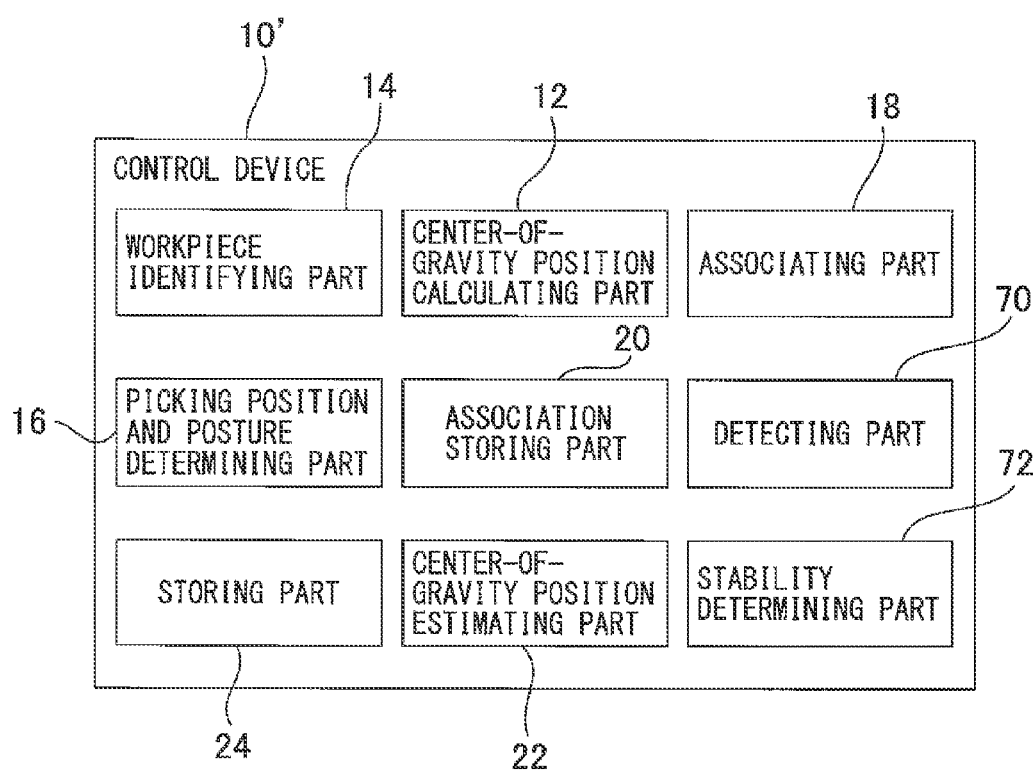
FIG. 9 shows a functional configuration of the control device according to one embodiment.

FIG. 9 shows a functional configuration of a control device 10' configured to determine the stability of the picking out process by using the force data obtained by the force measuring part such as the force sensor 42. The configuration and function of the control device 10' which have already been described above with reference to FIG. 2 will be omitted from the following explanation.

The detecting part 70 of the control device 10' cooperates with the force sensor 42 attached to the robot 40 to detect the maximum value or the average value of the force acting on the tool 44 at the time of picking out the workpiece 50. Alternatively, the detecting part 70 may detect the maximum value or the average value of the differential value of the force acting on the tool 44, so as to detect vibration at the time of picking out the workpiece 50. In this connection, the force may be a force or a moment of force, or an electric current value for driving the robot 40, which can be used instead of the force. If a pneumatic suction pad is used, the changes from the target pressure may be detected as well.

The stability determining part 72 of the control device 10' determines the stability of the picking out process of the workpiece 50, based on the information obtained by the detecting part 70. For example, the stability determining part 72 determines that the stability of the picking out process is low when the force detected by the detecting part 70 is great. The stability determining part 72 also determines that the stability of the picking out process is low when the differential value of the force is great, or in other words, the vibration is great, at the time of picking out the workpiece 50.

According to the present embodiment, the workpiece identifying part 14 of the control device 10' changes the priority for identifying the workpiece 50, based on the stability determined by the stability determining part 72, in the manner described below. The workpiece identifying part 14 determines the state of the workpiece and the easiness to pick out, for example whether or not the surface area of the workpiece which can be recognized is large, the workpiece is at a higher position among the piled up workpieces, or the workpiece is placed on another workpiece, based on the three-dimensional position information of the points on the surface of the workpiece 50 obtained by the three-dimensional measuring device 46. Scores are calculated for the respective candidate workpieces for picking out, such that a workpiece which is easier to pick out has a greater score. The workpiece identifying part 14 determines the priority of the workpieces based on those scores, and identifies the workpiece to be picked out. In this process, in the case where the stability information is obtained by the stability determining part 72 in relation to the positional information of the workpiece similar to the characteristics of the positional information of the workpiece obtained by the three-dimensional measuring device 46, the workpiece whose stability is estimated to be low is provided with a lower score, while the workpiece whose stability is estimated to be high is provided with a higher score. According to this scoring process, the workpiece identifying part 14 changes the priority of the workpiece to be identified for the picking out process.

In the present embodiment, alternatively or additionally, the picking position and posture determining part 16 of the control device 10' may change the holding position or the picking-out direction of the workpiece 50 or the posture of the tool 44 for the picking out process, based on the stability determined by the stability determining part 72.

Figure 10:
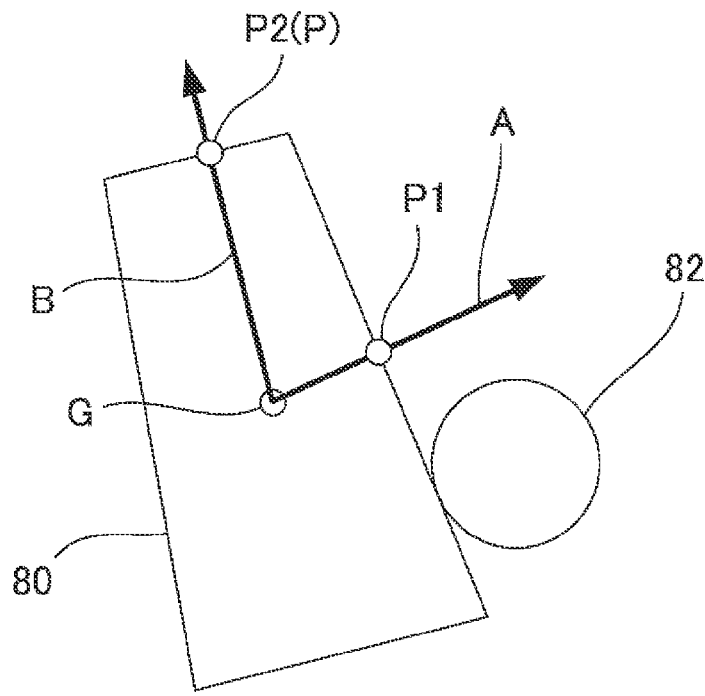
FIG. 10 shows an example in which the holding position and the picking-out direction of the workpiece are changed according to one embodiment.

FIG. 10 shows an example in which the holding position and the picking-out direction of the workpiece are changed according to the present embodiment. If it is possible to pick out the workpiece with changing the posture of the tool and without changing the picking-out direction, the posture of the tool and the holding position of the workpiece may be changed. In addition, one of the holding position, the picking-out direction and the posture of the tool may be changed as well. As shown in FIG. 10, a second workpiece 82 is arranged so as to be adjacent to a first workpiece 80 which is identified for picking out by the workpiece identifying part 14. The picking-out direction shown by arrow A is defined in a direction perpendicular to the face of the first workpiece 80, and the holding position depicted is defined at a point P1 distant from the center-of-gravity position G in the picking-out direction. Alternatively, the holding position may be defined at a point P1 at the shortest distance from the center-of-gravity position G of the workpiece 80, and the picking-out direction is defined as a direction from the center-of-gravity position G to the holding position P1. If the first workpiece 80 is picked out in the picking-out direction as shown by arrow A, due to the second workpiece 82 situated on the side in the picking-out direction, a relatively greater force or moment of force may be detected, or a relatively greater vibration of the force or moment of force may be detected. As a result, the detecting part 70 detects the greater force or moment of force or the greater vibration thereof, and therefore the stability determining part 72 determines that the stability of the picking out process is low.

In such a case, the positional information of the workpiece 80 obtained by the three-dimensional measuring device 46, and the stability information determined by the stability determining part 72, and the holding position or the picking-out direction of the workpiece 80 or the posture of the tool are associated with one another and stored in the storing part 24. When another workpiece is identified by the workpiece identifying part 14 in order to pick out the workpiece, the association information associated with the stability determined by the stability determining part 72 for a workpiece whose positional information is similar to that of the identified workpiece obtained by the three-dimensional measuring device 46 is applied. The association information is utilized to be able to stably pick out the workpiece and pick out the workpiece in a different manner from the manner whose stability is low. In this case, the picking position and posture determining part 16 changes the holding position of the workpiece, the picking-out direction of the workpiece, or the posture of the tool. In the example of FIG. 10, the picking position and posture determining part 16 changes the picking out process from the process whose stability is low based on the association information. The picking position and posture determining part 16 changes the picking-out direction to the upward direction shown by arrow B, which is different from the direction of arrow A, such as the direction including an upward component nearly perpendicular to the direction of arrow A, or the direction perpendicular to another face of the workpiece 80. The picking position and posture determining part 16 also changes the holding position to the position P2 offset from the center-of-gravity position G by a predetermined distance and in the picking-out direction. The picking position and posture determining part 16 may change the holding position to the position P2 distant from the holding position P1 by a predetermined distance and change the picking-out direction to the direction from the center-of-gravity position G to the holding position P2. In addition, in the example of FIG. 10, if the stability determining part 72 determines that the stability of the picking out process is low when the workpiece 80 is picked out in accordance with the holding position P1 and the picking-out direction shown by arrow A, the picking out process is stopped, and the holding position and the picking-out direction of the workpiece 80 or the posture of the tool may be changed as described above.

Figure 11:
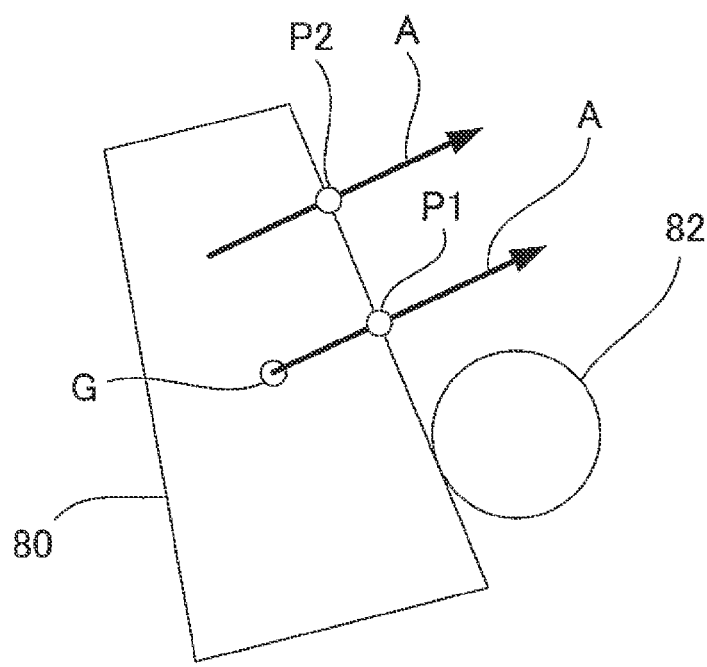
FIG. 11 shows an example in which the holding position of the workpiece is changed according to one embodiment.

FIG. 11 shows an example in which the holding position of the workpiece is changed according to the present embodiment. As described above with FIG. 10, if the first workpiece 80 is picked out in the picking-out direction as shown by arrow A, due to the second workpiece 82 situated on the side in the picking-out direction, the picking out process is unstable. This information is stored in the storing part 24 and it can be determined based on the association information described above. In comparison with the example of FIG. 10, the example of FIG. 11 is different therefrom in that only the holding position is changed by the picking position and posture determining part 16 based on the association information described above, and the picking-out direction or the posture of the tool are not subject to the changes. As shown in the illustrated example, the first workpiece 80 can be stably picked out by changing the holding position to point P2, instead of point P1, without changing the picking-out direction.

As described above with reference to FIGS. 10 and 11, according to the present embodiment, the picking position and posture determining part 16 can change the holding position of the workpiece, the picking-out direction of the workpiece, or the posture of the tool at the time of picking out the workpiece, based on the determination result of the stability, which is obtained and stored from the force data by the stability determining part 72 when the workpiece is picked out. When it is determined during the picking out process that the process is unstable, the process may be stopped, and the holding position of the workpiece, the picking-out direction of the workpiece or the posture of the tool may be changed. Therefore, even in the case where there is a cause of the unstable picking out process, which is not detected by the three-dimensional measuring device 46, the manner in which the picking process is carried out may be changed appropriately, allowing for a stable picking out process. In addition to the holding position and the picking-out direction of the workpiece, or alternatively, the position and posture of the tool may be changed.

Although the picking position and posture determining part 16 may change the holding position or the picking-out direction of the workpiece or the posture of the tool, based on the center-of-gravity position of the workpiece, as described above, a factor other than the center-of-gravity position of the workpiece may be considered as well. For example, if it is known that the workpiece can be easily picked out by sliding on the surface of another workpiece, the surface shape of the workpiece may be taken into account. The interference between the tool and the container may also be considered. The material of the workpiece, the configuration of the tool may also be considered. Accordingly, it should be noted that other factors which a person skilled in the art would regularly consider in operating the robot system may also be considered in order to implement the present invention.

EFFECT OF THE INVENTION

According to the present invention, at the time of picking out the workpiece, the center-of-gravity position of the workpiece is estimated, and based on the estimated center-of-gravity position, the holding position of the workpiece, the picking-out direction of the workpiece, or the position and posture of the tool are determined. Accordingly, the workpiece can be stably picked out and conveyed without a position of the workpiece being shifted or the workpiece falling. This can shorten the cycle time and decrease the running cost of the system.

Although the various embodiments and variants of the present invention have been described, it will be obvious to persons skilled in the art that the intended function and effect of the present invention may also be achieved by other embodiments or variants. In particular, a constituent element of the above-described embodiments and variants may be omitted or replaced, or a known means may also be added thereto, without departing from the scope of the present invention. Further, it would be obvious to persons skilled in the art that the present invention can be implemented by any combination of the features of the embodiments either explicitly or implicitly disclosed herein.

What is claimed is:

1. A robot system for picking out and conveying a workpiece placed in a three-dimensional space, the robot system comprising:
   a three-dimensional measuring device for measuring a surface position on the workpiece to obtain positional information of a plurality of points on a surface of the workpiece in a three-dimensional space;
   a robot movable in accordance with a specified position and posture;
   a tool attached to a tip portion of the robot and adapted to hold the workpiece;
   a force measuring part for measuring a force acting on the tool by the workpiece when the workpiece is held by the tool; and
   a control device for controlling the robot,
   the control device comprising:
   a workpiece identifying part for identifying a workpiece to be picked out and a position and posture of the workpiece, based on the positional information of the plurality of points obtained by the three-dimensional measuring device;
   a picking position and posture determining part for determining a holding position of the workpiece, a picking-out direction of the workpiece and a position and posture of the tool, so as to pick out the workpiece identified by the workpiece identifying part;
   a center-of-gravity position calculating part for calculating a center-of-gravity position of the workpiece held by the tool, based on force data measured by the force measuring part with a plurality of postures of the robot holding the workpiece;
   an associating part for associating the positional information of the workpiece held by the tool, which is obtained by the three-dimensional measuring device with the center-of-gravity position of the workpiece calculated by the center-of-gravity position calculating part;
   an association storing part for storing a result of the association made by the associating part; and
   a center-of-gravity position estimating part for estimating a center-of-gravity position of the workpiece identified by the workpiece identifying part, based on the result of the association stored by the association storing part,
   wherein the picking position and posture determining part is adapted to determine at least one of the holding position of the workpiece identified by the workpiece identifying part at the time of picking out the workpiece, the picking-out direction of the workpiece, the position and posture of the tool, based on the center-of-gravity position of the workpiece estimated by the center-of-gravity position estimating part.

2. The robot system according to claim 1,
   wherein the picking position and posture determining part is adapted to determine a holding position of the workpiece, based on the center-of-gravity position of the workpiece estimated by the center-of-gravity position estimating part, and
   wherein the picking position and posture determining part is adapted to determine an actual holding position of the workpiece at which the workpiece can be held, the actual holding position of the workpiece being a holding position falling within a range defined by a predetermined threshold from the holding position situated at a shortest distance from the center-of-gravity position of the workpiece estimated by the center-of-gravity position estimating part.

3. The robot system according to claim 1,
   wherein the picking position and posture determining part is adapted to determine a holding position of the workpiece, based on the center-of-gravity position of the workpiece estimated by the center-of-gravity position estimating part, and
   wherein the picking position and posture determining part is adapted to determine an actual holding position of the workpiece at which the workpiece can be held, based on the center-of-gravity position of the workpiece and on the picking-out direction of the workpiece or the posture of the tool at the time of picking out the workpiece.

4. The robot system according to claim 1, wherein the picking position and posture determining part is adapted to determine a position and posture of the tool at the time picking out the workpiece so that a moving direction at the time of picking out the workpiece matches a direction oriented from the center-of-gravity position to the holding position or to a position offset from the holding position by a predetermined distance.

5. The robot system according to claim 1, wherein the workpiece identifying part is adapted to identify another workpiece as an alternative, in the case where a distance between the center-of-gravity position and the holding position determined by the picking position and posture determining part or a position offset from the holding position exceeds a predetermined threshold.

6. The robot system according to claim 1, wherein in the case where the workpiece identified by the workpiece identifying part is under another workpiece, and a distance between a position defined in an area where the workpieces are placed on top of another and the holding position of the workpiece determined by the picking position and posture determining part or a position offset from the holding position by a predetermined distance is not greater than a predetermined threshold, the workpiece identifying part is adapted to identify another workpiece as an alternative.

7. The robot system according to claim 1, further comprising:
   a detecting part for detecting an intensity of a force and vibration generated at the time of picking out the workpiece, based on force data at the time of picking out the workpiece; and
   a stability determining part for determining stability at the time of picking out the workpiece, based on a result of detection by the detecting part,
   wherein the workpiece identifying part is adapted to change a priority order at the time of identifying the workpiece, based on a result of determination by the stability determining part.

8. The robot system according to claim 1, further comprising:

a detecting part for detecting an intensity of a force and vibration generated at the time of picking out the workpiece, based on force data at the time of picking out the workpiece; and a stability determining part for determining stability at the time of picking out the workpiece, based on a result of detection by the detecting part, wherein the picking position and posture determining part is adapted to change a holding position of the workpiece, a picking-out direction of the workpiece or a posture of the tool at the time of picking out the workpiece, based on a result of determination by the stability determining part.

* * * * *